(12) United States Patent
Ahmad et al.

(10) Patent No.: US 9,940,619 B2
(45) Date of Patent: Apr. 10, 2018

(54) PROCESSING NON-TRADITIONAL TRANSACTIONS ON A TRADITIONAL PAYMENT NETWORK

(75) Inventors: Farhan Ahmad, Chicago, IL (US); Meeri Siljamaki, Chicago, IL (US)

(73) Assignee: DFS Services LLC, Riverwoods, IL (US)

( * ) Notice: Subject to any disclaimer, the term of this patent is extended or adjusted under 35 U.S.C. 154(b) by 1033 days.

(21) Appl. No.: 12/835,517

(22) Filed: Jul. 13, 2010

(65) Prior Publication Data
US 2012/0016728 A1 Jan. 19, 2012

(51) Int. Cl.
*G06Q 40/00* (2012.01)
*G06Q 20/40* (2012.01)
(Continued)

(52) U.S. Cl.
CPC ............ *G06Q 20/40* (2013.01); *G06Q 20/04* (2013.01); *G06Q 20/10* (2013.01); *G06Q 20/12* (2013.01);
(Continued)

(58) Field of Classification Search
CPC .. G06Q 10/109; G06Q 20/355; G06Q 20/363; G06Q 20/387; G06Q 20/403; G06Q 20/06; G06Q 20/085; G06Q 20/0855; G06Q 20/123; G06Q 20/14; G06Q 20/18; G06Q 20/22; G06Q 20/29; G06Q 20/3221; G06Q 20/3255; G06Q 20/341; G06Q 20/347; G06Q 20/351; G06Q 20/3574;
(Continued)

(56) References Cited

U.S. PATENT DOCUMENTS 7,386,477 B2 6/2008 Fano
7,431,202 B1 10/2008 Meador et al.
(Continued)

OTHER PUBLICATIONS

Anonymous; Better than Freedom? Iraq's Mobile-Phone Revolution; The Economist (US) 393.8657: 54(EU). Economist Intelligence Unit N.A. Incorporated. (Nov. 14, 2009).*
(Continued)

*Primary Examiner* — Virpi H Kanervo
(74) *Attorney, Agent, or Firm* — Leydig, Voit & Mayer, Ltd.

(57) ABSTRACT

A system for and methods of processing non-traditional payment transactions on a traditional payment network is disclosed. More specifically, a payments system includes one or more payment program managers (PPMs), which are the providers of alternative payment products, in combination with one or more payment program processors (PPPs), which serve as processors for the PPMs. The PPMs and PPPs operate on a payment network, such as a traditional payment network. The payments system includes the utilization of traditional bank identification numbers (BINS) in order to process non-traditional transactions on a traditional payment network. Surrogate numbers are issued on BIN ranges to the non-traditional transactions in order to process them on the traditional payment network. Additionally, the payments system includes pricing structures that are associated with alternative payment products. These pricing structures are implemented and processed on the payment network, alongside the pricing structures of traditional payment products.

17 Claims, 7 Drawing Sheets

(51) Int. Cl.
*G06Q 20/04* (2012.01)
*G06Q 20/10* (2012.01)
*G06Q 20/12* (2012.01)
*G06Q 30/02* (2012.01)

(52) U.S. Cl.
CPC ......... *G06Q 30/0222* (2013.01); *G06Q 40/12* (2013.12)

(58) Field of Classification Search
CPC .......... G06Q 20/3674; G06Q 20/3829; G06Q 20/383; G06Q 20/4012; G06Q 20/4033; G06Q 30/0207; G06Q 30/0224; G06Q 30/0226; G06Q 30/0235; G06Q 30/06; G06Q 30/0201; G06Q 30/0211; G06Q 30/0222; G06Q 30/0225; G06Q 30/0238; G06Q 30/0239; G06Q 30/0241; G06Q 30/0258; G06Q 30/0283; G06Q 30/04; G06Q 30/0617; G06Q 30/0625; G06Q 30/0631; G06Q 30/0633; G06Q 30/0641; G06Q 40/06; G06Q 50/12
See application file for complete search history.

(56) References Cited

U.S. PATENT DOCUMENTS

| | | | |
|---|---|---|---|
| 7,503,489 B2 | 3/2009 | Heffez et al. | |
| 7,567,934 B2 | 7/2009 | Flitcroft et al. | |
| 7,571,142 B1 | 8/2009 | Flitcroft et al. | |
| 7,593,896 B1 | 9/2009 | Flitcroft et al. | |
| 2003/0212595 A1 | 11/2003 | Antonucci | |
| 2005/0171898 A1* | 8/2005 | Bishop et al. | 705/39 |
| 2007/0276707 A1* | 11/2007 | Collopy et al. | 705/5 |
| 2008/0048025 A1* | 2/2008 | Fitzgerald et al. | 235/380 |
| 2008/0167000 A1 | 7/2008 | Wentker et al. | |
| 2008/0167991 A1 | 7/2008 | Carlson et al. | |
| 2008/0270298 A1 | 10/2008 | McElroy et al. | |
| 2008/0270302 A1 | 10/2008 | Beenau et al. | |
| 2009/0037333 A1* | 2/2009 | Flitcroft et al. | 705/44 |
| 2009/0048926 A1 | 2/2009 | Salesky et al. | |
| 2009/0171777 A1 | 7/2009 | Powell | |
| 2009/0171778 A1 | 7/2009 | Powell | |
| 2009/0216646 A1 | 8/2009 | Seven et al. | |
| 2009/0271246 A1 | 10/2009 | Alvarez et al. | |
| 2009/0281945 A1 | 11/2009 | Shakkarwar | |
| 2009/0281951 A1 | 11/2009 | Shakkarwar | |
| 2009/0327133 A1* | 12/2009 | Aharoni et al. | 705/44 |
| 2011/0010237 A1 | 1/2011 | Shakkarwar | |
| 2011/0184856 A1 | 7/2011 | Shakkarwar | |
| 2011/0184857 A1 | 7/2011 | Shakkarwar | |
| 2011/0184858 A1 | 7/2011 | Shakkarwar | |
| 2011/0184866 A1 | 7/2011 | Shakkarwar | |
| 2011/0289001 A1* | 11/2011 | Bishop et al. | 705/44 |
| 2012/0005076 A1* | 1/2012 | Dessert et al. | 705/39 |

OTHER PUBLICATIONS

Gavin, James; Export Agencies Com to the Fore: As Project Financing in the Region Dries Up in the Wake of Global Credit Crunch, Export Credit Agencies and Multilateral Development Banks are Increasingly Filling the Gap; MEED Middle East Economic Digest 53.27: 40(2). EMAP Business Information Ltd. (Jul. 3, 2009).*

Miller, Matt; Underground Banking; Institutional Investor 33.1: 102(1). Euromoney Institutional Investor PLC. (Jan. 1999).*

* cited by examiner

PROCESSING NON-TRADITIONAL TRANSACTIONS ON A TRADITIONAL PAYMENT NETWORK

FIELD OF THE INVENTION

The present invention relates generally to the area of financial transaction processing, and more particularly to a system for and methods of processing non-traditional payment transactions on a traditional payment network.

BACKGROUND

Electronic transactions have become an everyday part of the economy via the financial services industry. Whether the use occurs in person or remotely (e.g., via the Internet or Mobile), utilization of various electronic payment instruments by both consumers and businesses is huge and rapidly growing. Thus, more and more merchants are seeing these types of transactions becoming a larger piece of how they receive payments for the goods and services they provide.

Examples of electronic payment instruments may include, but are not limited to, credit cards, debit cards, prepaid cards, alternative payment products, and the like. For the purpose of this disclosure, credit cards, debit cards, and prepaid cards are considered traditional payment products, which are supported by and processed via traditional payment networks. Examples of traditional payment networks may include, but are not limited to, VISA®, MasterCard®, American Express®, and Discover®. By contrast, alternative payment products are considered non-traditional payment products, which today are processed outside of the traditional payment networks. Examples of alternative payment products may include, but are not limited to, PayPal®, BillMeLater®, eLayaway®, and Amazonpayments™.

Systems that are designed to handle transactions of traditional payment products on traditional payment networks are not suited today to process transactions of non-traditional payment products, such as those of alternative payment products. Therefore, the providers of alternative payment products must typically establish direct relationships with merchants or merchant processors in order to facilitate their use (e.g., the relationship of PayPal® with an individual merchant for acceptance). With any payment product, a key factor in its success is its acceptance with as many merchants as possible. Unfortunately, because alternative payment products currently cannot be processed on traditional payment networks and thus need to establish direct relationships with merchants, there exists a significant barrier to their acceptance. The biggest barrier for non-traditional payment product acceptance is the technical development work and resources required from the merchants in order to start accepting non-traditional payment products. Therefore, what is needed are new approaches that overcome the barriers to acceptance of alternative payment products. In particular, what is needed is a way to process non-traditional transactions of alternative payment products on traditional payment networks, without requiring extensive system development efforts for merchant implementation.

Further, traditional payment products may have different pricing structures compared with those of the alternative payment products. Again, today the systems of traditional payment networks are designed to handle the pricing structure of traditional payment products and are not suited to handle the pricing structure of alternative payment products. This is yet another barrier to wide acceptance of alternative payment products. Therefore, new approaches are needed that allow the pricing structure of alternative payment products to be implemented and processed on traditional payment networks.

BRIEF SUMMARY OF THE INVENTION

A payment system is described whereby a traditional payment network is used to facilitate transactions using a non-traditional payment mechanism. A surrogate number taking the form of a traditional payment number is assigned for a non-traditional transaction, which is then processed by a merchant in a similar manner as a traditional transaction (e.g., a credit card transaction). The payment network operator distinguishes non-traditional transactions based, for example, on the subrange of the assigned surrogate number, and routes the transaction accordingly to a payment program processor or payment program manager for the non-traditional payment mechanism.

Such a system as described benefits customers, who as a result have more choice of payment products available at a larger number of merchants. Merchants benefit from the system by gaining acceptance of alternative payment products that can be implemented easily, and with little technical resources, and by consolidated settlement of traditional and non-traditional transactions. Merchants also benefit from: enhanced and differentiated reporting; deferred billing options; and payment product specific pricing. Processors of non-traditional payment programs benefit through the ability to offer consolidated services and faster time to market to all clients. The system may also provide increased revenue to the payment network operator.

Payment program managers for the non-traditional payment mechanisms benefit from additional acceptance of their alternative payment products, along with increased abilities to market for merchant implementation, consolidate settlement, and communicate deferred billing options. Payment program managers may utilize their own pricing to merchants and maintain their own brand.

In one aspect, a method is provided for processing a financial transaction between a payer and a merchant through an electronic financial transaction processing system using a first nontraditional payment mechanism, the method comprising electronically receiving, from an electronic device associated with the merchant, a request to authenticate the transaction, the request comprising indicia for the payer and the first non-traditional payment mechanism, authenticating the payer with an operator of the first non-traditional payment mechanism, determining a surrogate number for association with the transaction, the surrogate number being a payment number for use on a traditional payment network and having been allocated by the operator of the traditional payment network, associating the surrogate number with the transaction in a mapping database, and electronically transmitting the surrogate number to the merchant.

In another aspect, a method is provided for processing a financial transaction between a payer and a merchant through an electronic financial transaction processing system using a first non-traditional payment mechanism, the method comprising electronically receiving, from an electronic device associated with the merchant, an authorization request for the transaction, the request including a surrogate number previously associated with the transaction and indicia for use with the first non-traditional payment mechanism, the surrogate number being a payment number for use on a traditional payment network, transmitting the authorization request to a processor for the non-traditional payment program via the traditional payment network, the processor for the first non-traditional payment mechanism being identifiable by at least a portion of the surrogate number, determining, based on the surrogate number, a price to charge for processing the transaction, and electronically transmitting a response to the authorization request to the merchant.

In still another aspect, a method is provided for processing a financial transaction for a payer through an electronic financial transaction processing system using a non-traditional payment mechanism, the method comprising electronically receiving, from the payer and via an electronic device, purchase information for a transaction comprising indicia for the payer and the non-traditional payment mechanism, transmitting an authentication request comprising the indicia to a processor for the non-traditional payment mechanism or to an operator of a traditional payment network, receiving, in response to the transmission, a surrogate number for the transaction, the surrogate number having been associated with the transaction and the indicia, and the surrogate number being a payment number for use on a traditional payment network, transmitting an authorization request, via the traditional payment network, to a processor for the traditional payment mechanism, the authorization request comprising the surrogate number and a dollar amount for the purchase, electronically submitting, to the operator of the traditional payment network, either directly or indirectly, a settlement file comprising the surrogate number, and receiving an electronic transfer of funds, from the operator for the traditional payment network, for the transaction.

In yet another aspect, a method is provided for resolving a dispute between a payer and a merchant regarding a transaction over a non-traditional payment mechanism, the method comprising, electronically receiving, from an operator of the non-traditional payment mechanism, instructions to debit the merchant for the transaction, the instructions comprising indicia for the payer and the non-traditional payment network, and transaction details, retrieving from a mapping database, using the indicia and transaction details, a surrogate number for the transaction, the surrogate number having been previously associated with the transaction and the indicia, and the surrogate number being a payment number for use on a traditional payment network, and submitting a debit or credit for the merchant to the operator of the traditional payment network, using the surrogate number, in an amount corresponding to the transaction.

In one more aspect, a method is provided for settling payment for a plurality of transactions performed at a merchant through an electronic financial processing network, a subset of the plurality of transactions being associated with a traditional payment mechanism and a subset of the plurality of transactions being associated with a non-traditional payment mechanism, the method comprising electronically receiving, from the merchant, either directly or indirectly, a settlement file comprising the plurality of transactions at the merchant, each of the plurality of transactions associated with a traditional payment number, identifying the subset from the plurality of transactions that are associated with the non-traditional payment mechanism, transmitting, to a processor of the non-traditional payment mechanism, the settlement file comprising information for the identified subset of transactions, receiving through an electronic transfer a first amount of funds from an operator of the non-traditional payment mechanism, in accordance with the settlement file, and electronically transmitting a second amount of funds to the merchant.

In still another aspect, a method is provided for reporting on financial transactions involving a merchant over an electronic financial processing network using a first non-traditional payment mechanism, the method comprising electronically receiving, from the merchant, an electronic settlement file comprising information on at least one transaction made at the merchant using the first non-traditional payment mechanism, and at least one transaction made at the merchant using a traditional payment mechanism, the information for all transactions containing account numbers of a type used by the traditional payment mechanism, determining a first subset of transactions from the settlement file, each transaction in the first subset made using the first non-traditional payment mechanism, determining a second subset of transactions, from the settlement file, made using the traditional payment mechanism, electronically assembling information pertaining to the first subset in a first section of a report, electronically assembling information pertaining to the second subset in a second section of the report, and electronically transmitting the report to the merchant.

In a still further aspect, a system is provided for processing a financial transaction between a payer and a merchant using a traditional payment mechanism and a non-traditional payment mechanism, comprising an input device controlled by the merchant for inputting indicia for the payer, the transaction and the non-traditional payment mechanism, a non-traditional payment routing processor, in connection over an electronic financial transaction network with the input device, for determining that the transaction is to be performed in part through the non-traditional payment mechanism, a non-traditional payment numbering system for associating a traditional payment number with the transaction, the non-traditional payment numbering system comprising, a first database comprising traditional payment numbers available for association with the transaction, a number association engine for determining one of the available traditional payment numbers from the first database to associate with the transaction based upon stored determination criteria, and a mapping database for storing information related to the association between the transaction and the traditional payment number, a pricing database for storing pricing information corresponding to the traditional payment number, and a pricing engine for determining a price to charge for the transaction based upon stored information in the pricing database.

BRIEF DESCRIPTION OF THE SEVERAL VIEWS OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The present disclosure describes a system for and methods of processing non-traditional payment transactions on a traditional payment network. More specifically, a payments system of the present invention includes one or more payment program managers, which are the providers of alternative payment products. The payments system of the present invention also includes one or more payment program processors, which serve as processors for the payment program managers. The payment network enables the payment program managers and payment program processors to process non-traditional transactions on a payment network, which is a traditional payment network. Further, mechanisms are provided by the payment network for implementing the pricing structures of alternative payment products on the traditional payment network.

Non-traditional payment products have very unique account numbers that are not compatible with the traditional bank identification numbers (i.e., BIN or IIN). Because of the unique alternative payment product account numbers, there is a significant amount of technical development work and resources required from the merchants in order to start accepting non-traditional payment products through a direct relationship with the alternative payment product. This in turn makes it harder for the alternative payment products to grow their acceptance, which is extremely essential to any payment product. Because a traditional payment network already has broad acceptance and owns BINs, it makes sense for the payment network to utilize the acceptance network it has built as well as the BINs in order to enable the processing of the non-traditional payment products on a traditional payment network.

The payments system of the present invention therefore includes the utilization of the BINs, owned by the payment network, in order to process non-traditional transactions on a traditional payment network. Because all the merchant's systems already know how to process transactions under the BINs, it makes sense to issue surrogate numbers on BIN ranges to the non-traditional transactions in order to process them on the traditional payment network. This way there is minimal development and implementation work required by the merchant in order to start accepting non-traditional payment products. Because the largest barrier for merchant acceptance is removed by use of the present invention, payments system of the present invention also provides faster speed to market to both the payment program managers as well as the merchants. In order to drive even more flexibility, payments system of the present invention includes the creation and utilization of subranges out of master BIN ranges.

Another aspect of the payments system and methods of the present invention for processing non-traditional payment transactions on a traditional payment network is that the pricing structures associated with alternative payment products is implemented and processed on the payment network, alongside the pricing structures of traditional payment products. This pricing structure enables a very flexible way of processing for merchant discount (rate and per transaction fees) as well as Issuer Interchange to the payment program managers.

Figure 1:
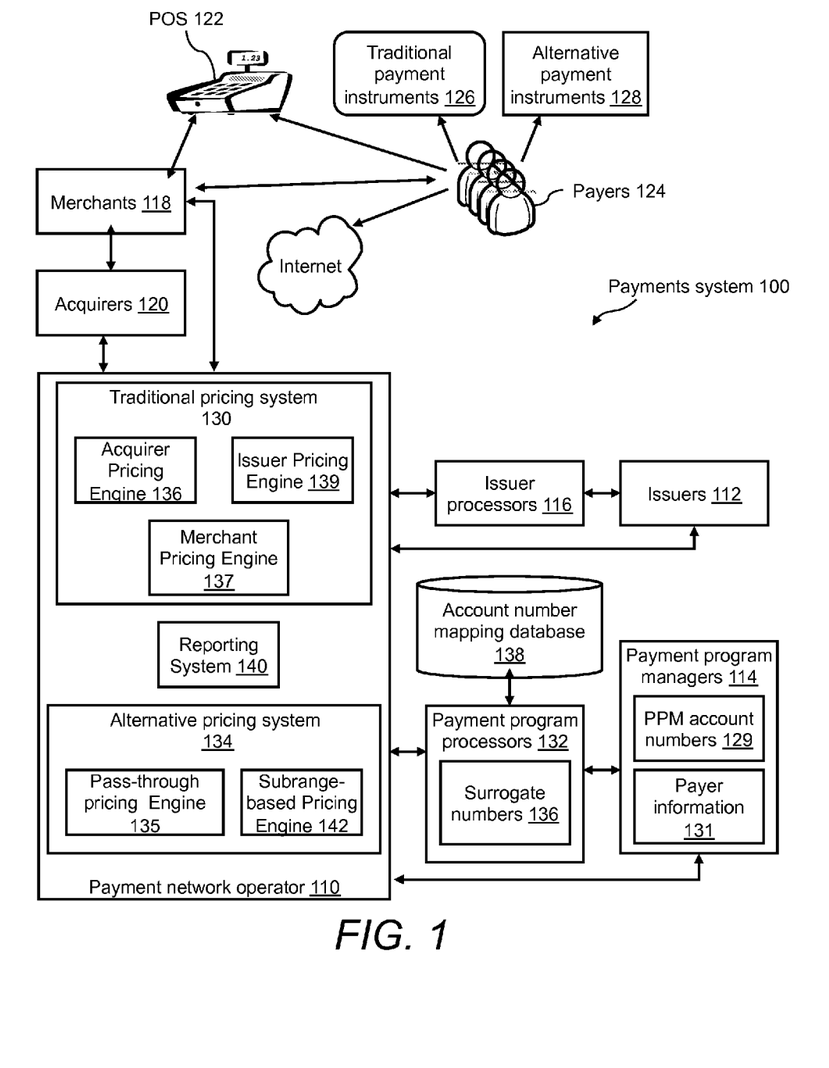
FIG. 1 illustrates a functional block diagram of an example of a payments system for processing non-traditional payment transactions on a traditional payment network, according to the present invention.

FIG. 1 illustrates a functional block diagram of an example of a payments system 100 for processing non-traditional payment transactions on a traditional payment network, according to the present invention. Payments system 100 is a system that includes physical and/or electronic infrastructure and associated procedures and protocols that are used to settle financial transactions between any entities connected to or otherwise associated with its payment network, operated by payment network operator 110.

Payment network operator 110 is an entity that enables payment/value exchange between any parties that operate in conjunction with the payment network according to certain standards and/or rules for payment processing. Payment network operator 110 facilitates the authorization of payments and facilitates the settlement of funds between entities. According to an embodiment of the present invention, the payment network operated by operator 110 supports (1) traditional payment products, such as credit, debit, and prepaid, as well as (2) alternative payment products. For example, one or more issuers 112, which are associated with traditional payment products, and one or more payment program managers (PPMs) 114, which are associated with alternative payment products, may be physically connected to, electronically connected to, and/or otherwise associated with payment network operator 110 of payments system 100.

Issuers 112 are parties (financial institutions, banks, credit unions, or companies) that issue, or cause to be issued, traditional payment vehicles, such as credit, debit, and prepaid cards, to cardholders. The credit, debit, and prepaid products that are owned by issuers 112 are examples of traditional payment products. Issuers 112 own the traditional payment products and the relationships with consumers. Examples of issuers 112 may include, but are not limited to, Bank of America, HSBC, Chase and Discover Card.

Associated with the one or more issuers 112 are one or more issuer processors 116. An issuer processor 116 is an entity that provides transaction and/or data processing services on behalf of an issuer 112 for traditional payment products. A certain issuer processor 116 may be associated with one issuer 112 only or a certain issuer processor 116 may be associated with multiple issuers 112. One company can perform, and therefore be both an issuer processor 116 and an issuer 112 at the same time. The issuer 112 provides final approval or denial of transactions and returns through the issuer processor 116 the approval or denial information back to payment network operator 110, where payment network operator 110 then returns the approval or denial information to the originating merchant 118 or acquirer 120. In one example, payments system 100 includes one or more merchants 118 and one or more acquirers 120. The information may or may not follow the exact data path of the transaction, but typically flows in the reverse order that the authorization request traveled.

A merchant 118 is an entity that accepts payments for goods and/or services. Merchants 118 may include both Internet-based merchants for providing online shopping and physical merchants (i.e., brick & mortar) that have physical points-of-sale (POS), such as POS 122. Each merchant 118 may be responsible for cardholder or payer verification, security verification, and authorization protocol compliance. An acquirer 120 is an entity that facilitates payment processing between merchants 118 and payment network operator 110. More specifically, an acquirer 120 provides transaction and/or data processing services and routes an authorization request from a merchant 118 to an issuer processor 116 via payment network operator 110. Alternatively, transaction and/or data processing may occur directly between a merchant 118 and payment network operator 110, without the use of an acquirer 120.

FIG. 1 also shows one or more payers 124 that are using payments system 100 for making purchases. Payers 124 may make purchases from merchants 118 via the Internet, Mobile or any POS 122. Payers 124 may be any individuals and/or entities that are making payments to and/or purchasing goods and/or services from merchants 118. Additionally, payers 124 may be customers of issuers 112 and/or of PPMs 114. In one example, payers 124 may be cardholders of the traditional payment products provided by issuers 112. In this case, payers 124 may be using traditional payment instruments 126, which may be any means of providing account information at the time of purchase, such as, but not limited to, plastic credit, debit, and prepaid cards. However, payments system 100 also allows payers 124 to use alternative payment products of PPMs 114. In this case, payers 124 may be using alternative payment instruments 128, which may be any means of providing account information at the time of purchase. Alternative payment instruments 128 may be, for example, a PPM 114 account number that is entered at a physical POS 122 or entered via the Internet or just providing a birth date, user ID or other information in order to identify the payer 124.

Associated with issuers 112, which are providing the traditional payment products, is a traditional pricing structure 130. The information of traditional pricing system 130 resides at payment network operator 110 of payments system 100. Traditional pricing system 130 is used to support and process the traditional transactions that occur on the payment network. Within traditional pricing system 130 are a variety of computerized systems and engines for determining prices related to the processing of payment transaction. For example, an acquirer pricing engine 136 is used to calculate a price to be paid by an acquirer 120 with respect to a transaction. A merchant pricing engine 137 is used to calculate a price to be paid by a merchant 118 with respect to a transaction. And an issuer pricing engine 139 is used to calculate a price to be paid by an issuer 112 with respect to a transaction.

Currently, with respect to traditional pricing structure 130, card products offered by issuers 112 may include, for example, different type of card products (e.g., gold, silver, platinum, etc.). A card product may be used to associate with a card number to indicate the type of product, (i.e., gold, silver, platinum, etc.). Certain pricing may be implemented based on the type of card product, where typically the pricing is a percent price rate plus a per transaction fee (PTF). By way of example, for a "gold" product of a certain payment network operator 110 the pricing may be implemented by merchant category code (MCC), for example.

The example above is typical of information included in traditional pricing structure 130 for processing traditional transactions via the payment network. With respect to traditional pricing structure 130, one card product key may be associated with one set of card numbers. Cards with numbers in this set always have the same pricing because the card product key includes the pricing for the product (e.g., pricing for gold, silver, platinum, etc. products) across different MCCs.

PPMs 114 are the entities that have developed and established the alternative payment products. PPMs 114 own the alternative payment products, the brand and the relationships with consumers (e.g., payers 124). Associated with the one or more PPMs 114 are one or more payment program processors (Pops) 132. The PPMs 114 establish a relationship with payment network operator 110 for processing their non-traditional transactions. Payment network operator 110 provides processing services regarding authorizations, settlement, disputes, and pricing to the PPMs 114 and Pops 132. In particular, payment network operator 110 provides PPMs 114 specific pricing as well as consolidated and enhanced settlement and reporting. This all is enabled by the intelligence built by the payment network operator 110 into the master BIN and subranges as well as the pricing capabilities built by the payment network operator 110 onto all of the systems of the payment network operator 110. Examples of PPMs 114 may include, but are not limited to, PayPal®, BillMeLater®, eLayaway®, and Amazonpayments™. While the use of PPMs 114 may typically be associated with online or Internet transactions (i.e., e-commerce), payments system 100 of the present invention may also facilitate their use at physical POS locations, such as POS 122 or on Mobile phones.

PPM account numbers 129 are assigned to respective customers (e.g., payers 124) of PPMs 114. Because the PPMs 114 have relationships with the consumers (e.g., payers 124), payer information 131 resides at each PPM 114. Payer information 131 may include, for example, the PPM account number 129, payer name, payer address, payer phone number, product type, product payment limit, and the like.

A PPP 132 is an entity that provides transaction and/or data processing services to PPMs 114 and merchants 118. A certain PPP 132 may be associated with one PPM 114 only or a certain PPP 132 may be associated with multiple PPMs 114. Also, as is the case with the traditional issuers 112 and issuer processor 116, one party can perform both functions and, therefore, be both a PPP 132 and a PPM 114 at the same time. The PPM 114 provides final approval or denial of transactions and returns through the PPP 132 the approval or denial information back to payment network operator 110, where payment network operator 110 then returns the approval or denial information to the originating merchant or acquirer.

Associated with PPMs 114, which are providing the alternative payment products, is an alternative pricing system 134. Alternative pricing system 134 is used because traditional pricing structures, such as traditional pricing system 130, typically cannot be altered (i.e., are inflexible) because of the operation of the traditional network environment.

The alternative pricing system 134 resides at and is managed by the payment network operator 110 of payments system 100. Alternative pricing system 134 is used to support, manage, and process the non-traditional payment transactions that occur on the payment network. In this way, payment network operator 110 provides processing services regarding authorizations, settlement, disputes, PPM-specific pricing, as well as reporting. Alternative pricing system 134 may contain different sub-components, such as a pass-through pricing engine 135 and a subrange-based pricing engine 142. The pass-through pricing engine is used, for example, to determine that no fees are to be collected by the payment network operator 110 from the merchant 118 for a given transaction, and instead all fees are passed through to the payment program manager 114, who typically will pay fees to the payment network operator 110 according to an arrangement. A subrange-based pricing engine 142 is used, for example, to determine a price to charge for a given transaction, as described more fully below. With respect to alternative pricing system 134 and the alternative payment products offered by PPMs 114, certain features of the pricing system are implemented as follows.

1 A new pricing matrix is built that includes multiple price points, both rate (%) as well as per transaction fees ($).
2 Multiple price points are associated to one master BIN range.
3 Rates (%) and per transaction fees ($) are associated to different BIN subranges.
4 PPMs 114 are allowed to utilize all price points within the pricing matrix.
5 PPMs 114 are allowed to choose any rates and any PTFs individually and/or in any combination of rate and a PTF.
6 PPMs 114 are allowed to utilize the same price points simultaneously.
7 PPMs 114 are allowed to switch between price points as needed.
8 The payment network operator 110 has the ability to add new rates and PTFs as well as expire rates and PTFs that are no longer needed within the pricing matrix.
9 In one example, the pricing within alternative pricing system 134 may be price points of a certain percentage rate plus PTF as follows:
   Price point A: 0%+$0.10
   Price point B: 1%+$0.10
   Price point C: 1.25%+$0.10
   Price point D: 1.5%+$0.10
   Price point E: 2%+$0.20
   Price point F: 3%+$0.00
   Price point G: 3%+$0.10

Further to the example, the different price points may be implemented, for example, by product type, by MCC, by transaction amount, by monthly sales volume, and any combinations thereof. For example, for a first PPM 114 the price points may be implemented by product type as follows: Silver=Price point A, Gold=Price point C, and Platinum=Price point E.

Whereas, for a second PPM 114 the price points may be implemented by MCC as follows: Travel=Price point E, Retail=Price point D, and all other MCCs=Price point B.

Whereas, for a third PPM 114 the price points may be implemented by transaction amount as follows: $0-$3,000=Price point F, $3,000-$10,000=Price point E, and >$10,000=Price point B.

Whereas, for a fourth PPM 114 the price points may be implemented by monthly sales volume as follows: $0-$3,000=Price point F, $3,000-$10,000=Price point E, $10,000-$100,000=Price point B, and >$100,000=Price point G.

The payment network operator 110 assigns the master BIN ranges to a PPP 132. The main function of a PPP 132 is to divide the master BIN range into subranges as needed for the PPMs' 114 transactions. PPP 132 then communicates to the payment network operator 110 the subrange assignments with the desired pricing associated to each subrange. As transactions take place at a merchant, the PPP 132 then issues the surrogate numbers out of the correct subranges. The payment network operator 110 systems will then process the transactions accordingly, i.e., charge the merchant for discount rate & PTF and pay the PPMs 114 with the correct interchange. These surrogate numbers are therefore used at the back end for processing in place of the original alternative payment account numbers of the PPMs 114. This is an enabling function of payments system 100 for easy implementation and acceptance of alternative payment products (e.g., PPMs 114) on a traditional payment network. In one example, certain ranges of surrogate number 136 are allocated at each PPP 132. An example of ranges of surrogate numbers 136 are shown in Table 1. Also shown in Table 1 is an example of the alternative pricing structure associated with the ranges of surrogate numbers 136.

TABLE I

Table 1 Example ranges of surrogate numbers 136

| Description | Pricing Code (% rate) | Pricing Code (PTF) | | 8 digit range (Master) | | Subrange | | Number of surrogate numbers |
|---|---|---|---|---|---|---|---|---|
| First product type of PPM 114 | 1.60% | $0.15 | Low | 6011 | 0000 | 0000 | 0000 | 300,000 |
|  |  |  | High | 6011 | 9999 | 0399 | 9999 |  |
| Second product type of PPM 114 | 3.10% | $0.10 | Low | 6011 | 0000 | 0400 | 0000 | 100,000 |
|  |  |  | High | 6011 | 9999 | 0499 | 9999 |  |
| Third product type of PPM 114 | 4.50% | $0.20 | Low | 6011 | 0000 | 0500 | 0000 | 100,000 |
|  |  |  | High | 6011 | 9999 | 0599 | 9999 |  |
| Fourth product type of PPM 114 | 1.00% | $0.05 | Low | 6011 | 0000 | 0600 | 0000 | 200,000 |
|  |  |  | High | 6011 | 0000 | 0799 | 9999 |  |
| Unassigned |  |  | Low | 6011 | 0000 | 0800 | 000 | 9,300,000 |
|  |  |  | High | 6011 | 9999 | 9999 | 999 |  |

Referring again to the example surrogate numbers 136 in Table 1, for a first product type of PPM 114, PPP 132 allocates a subrange from 0000 0000 to 0399 9999, with the intended number of usable surrogate numbers 136 to be about 300,000. For a second product type of PPM 114, PPP 132 allocates a subrange from 0400 0000 to 0499 9999, with the intended number of usable surrogate numbers 136 to be about 100,000. For a third product type of PPM 114, PPP 132 allocates a subrange from 0500 0000 to 0599 9999, with the intended number of usable surrogate numbers 136 to be about 100,000. For a fourth product type of PPM 114, PPP 132 allocates a subrange from 0600 0000 to 0799 9999, with the intended number of usable surrogate numbers 136 to be about 200,000. About 9,300,000 surrogate numbers 136 remain unassigned.

PPPs 132 may generate surrogate numbers 136 on a transaction-by-transaction basis. In this case, a different surrogate number 136 is provided for each transaction that occurs via the payment network. Additionally, PPPs 132 may generate the same surrogate number 136 for a certain payer 124 who is shopping at a certain merchant 118, where this surrogate number 136 is reused for each transaction of the same payer 124 at the same merchant 118. For example, a surrogate number 136 is generated for payer John Doe who is shopping at Bob's Tire Store. Then, every time that payer John Doe uses an alternative payment product to perform a transaction at Bob's Tire Store the same surrogate number 136 is reused. In this example, the alternative payment instrument 128 used by payer John Doe may be, for example, a PPM 114 account number that is entered at a physical POS 122 or entered via the Internet or just by providing a birth date, user ID or other information in order to identify payer 124.

Payments system 100 also includes an account number mapping database 138 for storing records of the mapping of the original PPM account numbers 129 to the generated surrogate numbers, which are in the allocated BIN ranges. In other words, account number mapping database 138 stores the associations of the original PPM account numbers 129 to the generated surrogate numbers 136. Referring again to payer John Doe, account number mapping database 138 stores a record of payer John Doe's original PPM account number 129 and the corresponding surrogate numbers 136 that are assigned to payer John Doe for use at different merchants 118 such as Bob's Tire Store.

Payments system 100 may be used by payers 124 to perform traditional transactions with merchants 118 using traditional payment instruments 126 of issuers 112. These traditional transactions are performed using traditional transaction processes that are well known. In addition however, payments system 100 may facilitate the use of alternative payment products. The operation of payments system 100 with respect to processing non-traditional payment transactions on a traditional payment network may be summarized as follows. A certain payer 124 selects merchandise to purchase from a certain merchant 118. This may be an online purchase over the Internet or a purchase at a physical POS 122 of a physical store.

In order to pay for the purchase, the payer 124 presents to the merchant 118 unique account information of a particular alternative payment product (i.e., of a certain PPM 114) via, for example, an alternative payment instrument 128. The transaction may then be processed as follows; however, there may be some changes to this transaction process depending on the set-up between parties. Merchant 118 connects to the PPP 132, who in turn sends the purchase information to the PPM 114 for customer authentication and to authorize the transaction. The PPM 114 then authenticates the customer and authorizes the transaction and sends this information to the PPP 132. The PPP 132 issues a surrogate number 136 that is in a certain BIN subrange assigned for this particular PPM 114. The PPP 132 also stores the association of the PPM account number 129 to the surrogate number 136 that is generated. The PPP 132 transmits the surrogate number 136 back to the originating merchant 118. The merchant 118 recognizes the surrogate number 136 as a traditional BIN and processes the transaction using traditional processes on the payment network. The merchant 118 may then pass the transaction through traditional authorization and/or settlement processes using traditional transaction processes of payment network operator 110. Further, when processing the transaction, payment network operator 110 processes pricing for the alternative payment transactions, performs settlement, and produces reports for these transactions.

The intelligence built by the payment network operator 110 into the BIN subranges provides merchants 118, PPPs 132, and PPMs 114 with enhanced reporting, as implemented via a reporting system 140. All reporting that is provided to the three parties displays transactions by subrange and show totals by each PPM 114. This in turn provides these parties with a level of detail and flexibility that is not found in current payment systems. For example, in previous systems transactions were reported under the master BIN ranges and not at the subrange level. Because the described system provides details at the subrange level, merchant statements can be updated to show separate sections for discounts/fees attributable to traditional payment transactions and non-traditional payment transactions, yet a single section can consolidate settlement activity for the merchant.

The capability of the subrange assignments can also be used by merchants 118 and PPMs 114 to communicate different deferred payment plan options, such as 90 days same as cash or 6 months no interest for example. The way this is implemented is that a specific subrange is assigned by the PPP 132 to, for example, a program with 6 months no interest payment option for the payer 124 under a specific program of the PPM 114. When a transaction comes in from a merchant 118, the PPP 132 issues the correct surrogate number 136 for that transaction. The payment network operator 110 then processes the pricing accordingly and produces reports at the subrange level. Based on the reporting provided by the reporting systems 140 of the payment network operator 110 and the sub-BIN range utilized, the PPM 114 and the merchant 118 can tell that the transaction was qualified for a 6 months no interest payment option and then take the appropriate step to manage the payer 124 account.

More details of examples of methods that may be used for processing non-traditional payment transactions on a traditional payment network are described with reference to FIGS. 2A, 2B, 3, 4, 5, and 6. In one example, the full process flow for processing non-traditional transactions that result from using PPMs 114 may begin with method 200 of FIG. 2, which is then followed by method 300 of FIG. 3, which is then followed by method 400 of FIG. 4.

Figure 2A:
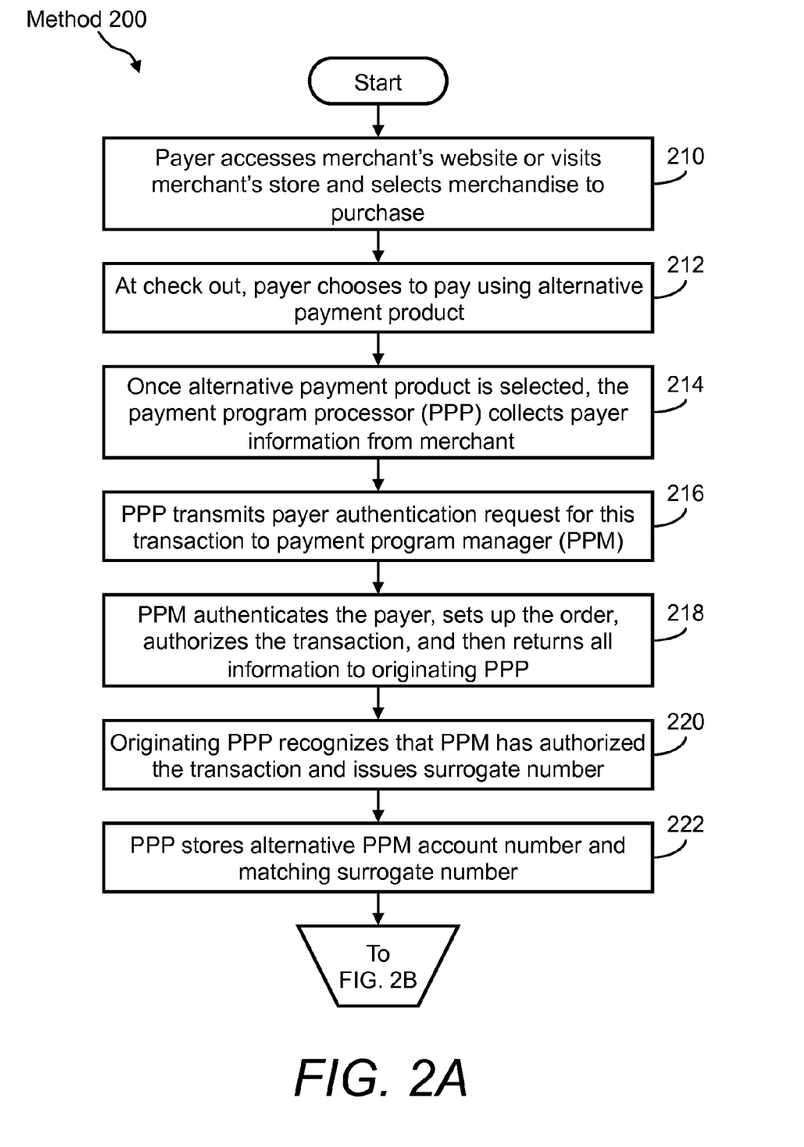
FIGS. 2A and 2B illustrate a flow diagram of an example of a method of performing customer authentication for alternative payment products prior to authorization on a traditional payment network, according to the present invention.
Figure 2B:
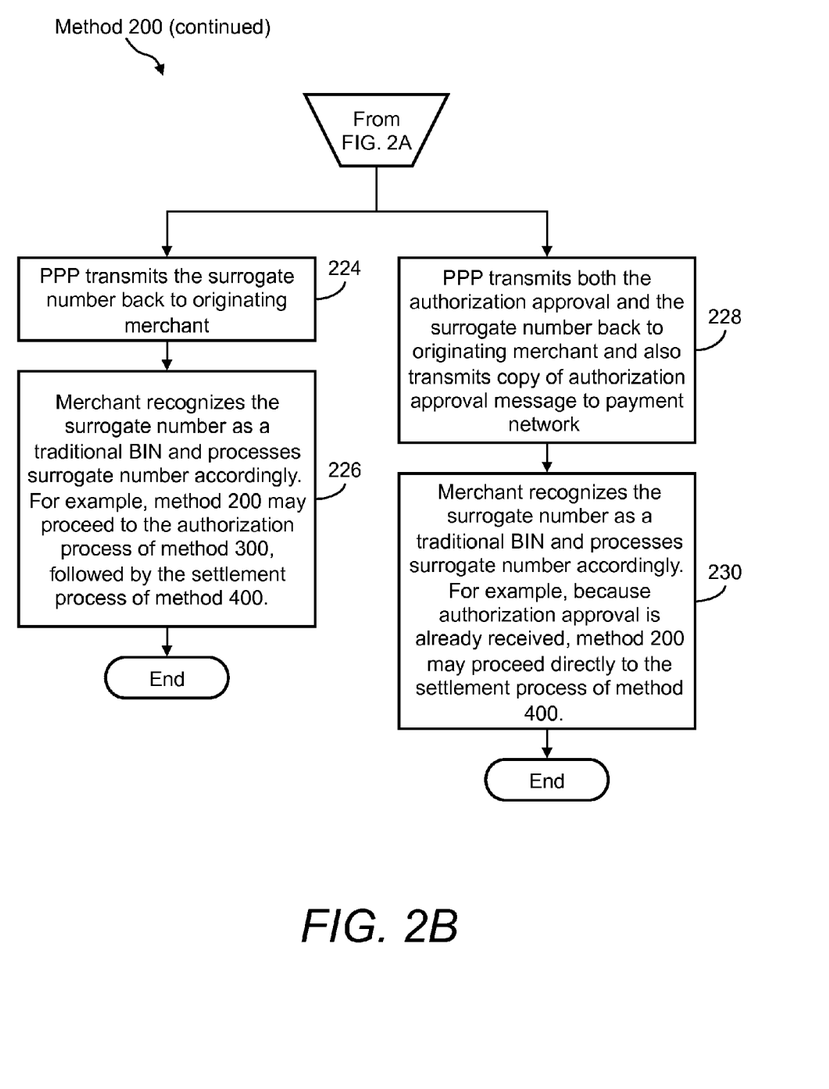

FIGS. 2A and 2B illustrate a flow diagram of an example of a method 200 of performing customer authentication for alternative payment products prior to authorization on a traditional payment network, according to the present invention. Method 200 is performed using payments system 100 of the present invention. Method 200 may include, but is not limited to, the following steps, which may be implemented in any order.

At step 210, a payer accesses a merchant's website via the Internet or visits the merchant's store and selects merchandise to purchase. For example, a certain payer 124 may access the website of a certain merchant 118 and selects merchandise to purchase, which are placed in the online shopping cart. Alternatively, a certain payer 124 may visit the brick & mortar store of a certain merchant 118 and selects physical merchandise to purchase.

At step 212, at check out, the payer chooses to pay using an alternative payment product. Using the example of an online purchase via the Internet, at the check out webpage of the merchant 118, the payer 124 selects the desired payment method. For example, the payer 124 clicks on the icon of a certain PPM 114, which is an example of an alternative payment instrument 128. Alternatively, a certain payer 124 may select an alternative payment instrument 128 at the checkout counter of a physical retail location. In this example, the alternative payment instrument 128 may be, for example, a plastic card that has a predetermined surrogate number 136 indicated thereon. The payer 124 confirms the purchase through either the Internet, Mobile or via POS 122.

At step 214, once the alternative payment product is selected, the PPP 132 collects payer information from the merchant 118. For example, once the certain PPM 114 is selected, the associated PPP 132 collects payer information from the merchant 118.

At step 216, the PPP 132 transmits a payer authentication request for this transaction to the PPM 114. Referring again to FIG. 1, PPM 114 may query payer information 131 that resides at the PPM 114. Again, payer information 131 may include, for example, the PPM account number 129, payer name, payer address, payer phone number, product type, product payment limit, and the like.

At step 218, the PPM 114 authenticates the payer 124, sets up the order, authorizes the transaction, and then returns all information to the originating PPP 132.

At step 220, the originating PPP 132 recognizes that the PPM 114 has authorized the transaction and issues a surrogate number 136 according to, for example, Table 1. In one example, when issuing on a transaction-by-transaction basis, PPP 132 issues a surrogate number 136 for this particular transaction. In other example, PPP 132 may generate a surrogate number 136 that may be reused for this certain payer 124 at this certain merchant 118.

At step 222, the PPP 132 stores PPM account number 129 and matching surrogate number 136 in account number mapping database 138. In one scenario, method 200 may proceed to step 224. In another scenario, method 200 may proceed to step 228.

At step 224, in one scenario, the PPP 132 transmits the surrogate number 136 back to the originating merchant 118.

At step 226, the merchant 118 recognizes the surrogate number 136 as a traditional BIN and processes the surrogate number 136 accordingly on the payment network to traditional transaction processes but that now include PPMs 114 and PPPs 132. For example, method 200 may proceed to the authorization process of method 300 of FIG. 3, followed by the settlement process of method 400 of FIG. 4. At this point, the customer (e.g., payer 124) that initiated the non-traditional transaction is considered authenticated and the transaction is authorized.

At step 228, in another scenario, the PPP 132 transmits both the authorization approval and the surrogate number 136 back to the originating merchant 118. The PPP 132 also transmits a copy of the authorization approval message to payment network operator 110.

At step 230, the merchant 118 recognizes the surrogate number 136 as a traditional BIN and processes the surrogate number 136 according to traditional transaction processes but that now include PPMs 114 and PPPs 132. For example, because authorization approval is already received, method 200 may proceed directly to the settlement process of method 400 of FIG. 4. At this point, the customer (e.g., payer 124) that is initiated the non-traditional transaction is considered authenticated and the transaction is authorized.

Figure 3:
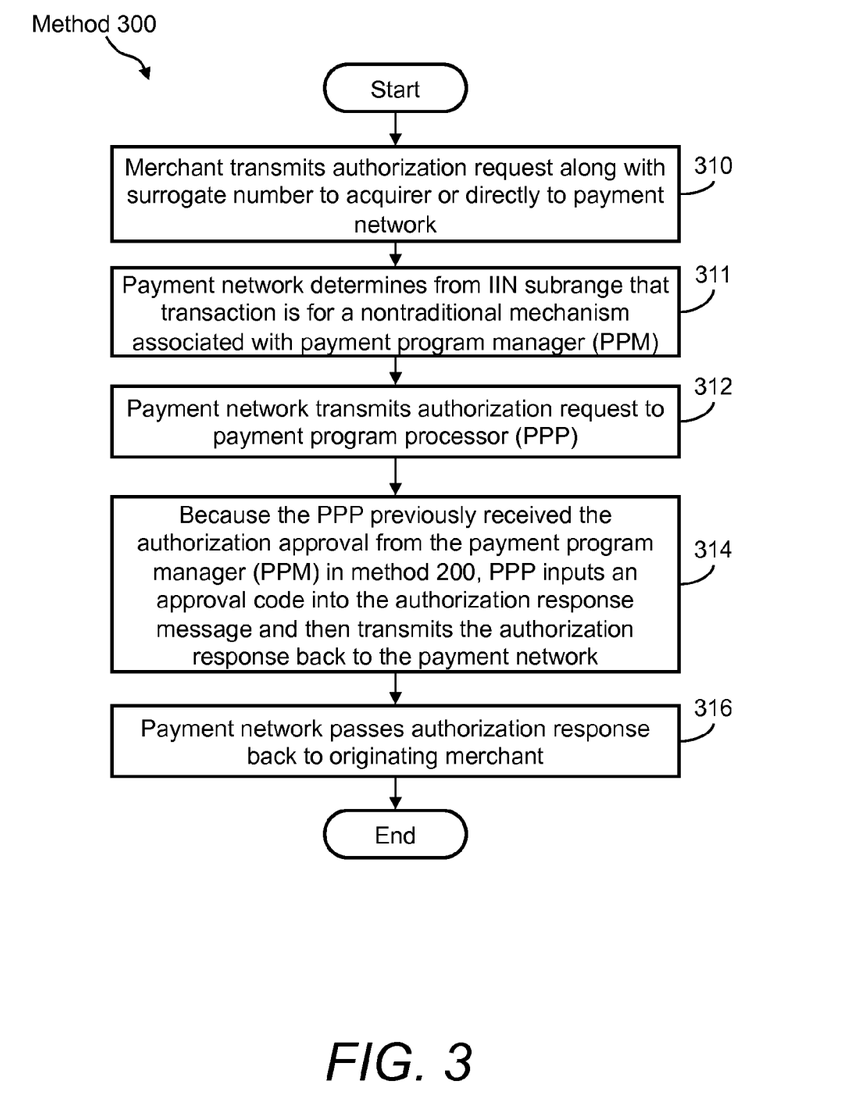
FIG. 3 illustrates a flow diagram of an example of a method of performing authorization of non-traditional payment transactions on a traditional payment network, according to the present invention.

FIG. 3 illustrates a flow diagram of an example of a method 300 of performing authorization of non-traditional payment transactions on a traditional payment network, according to the present invention. Method 300 is performed using payments system 100 of the present invention. Method 300 may occur following the execution of method 200 of FIG. 2. Method 300 may include, but is not limited to, the following steps, which may be implemented in any order.

At step 310, the merchant 118 transmits an authorization request along with a surrogate number 136 to acquirer 120 or directly to payment network operator 110.

At step 311, the payment network operator 110 determines from the surrogate number subrange that the transaction is for a nontraditional payment mechanism, associated with a particular PPM 114.

At step 312, payment network operator 110 transmits the authorization request to the PPP 132 who is processing for the particular PPM 114.

At step 314, because the PPP 132 previously received the authorization approval from the PPM 114 in method 200, the PPP 132 inputs an approval code into the authorization response message and then transmits the authorization response back to payment network operator 110.

At step 316, payment network operator 110 passes the authorization response back to the originating merchant 118 either directly or through an acquirer 120. At this point, the non-traditional transaction is considered authorized.

Figure 4:
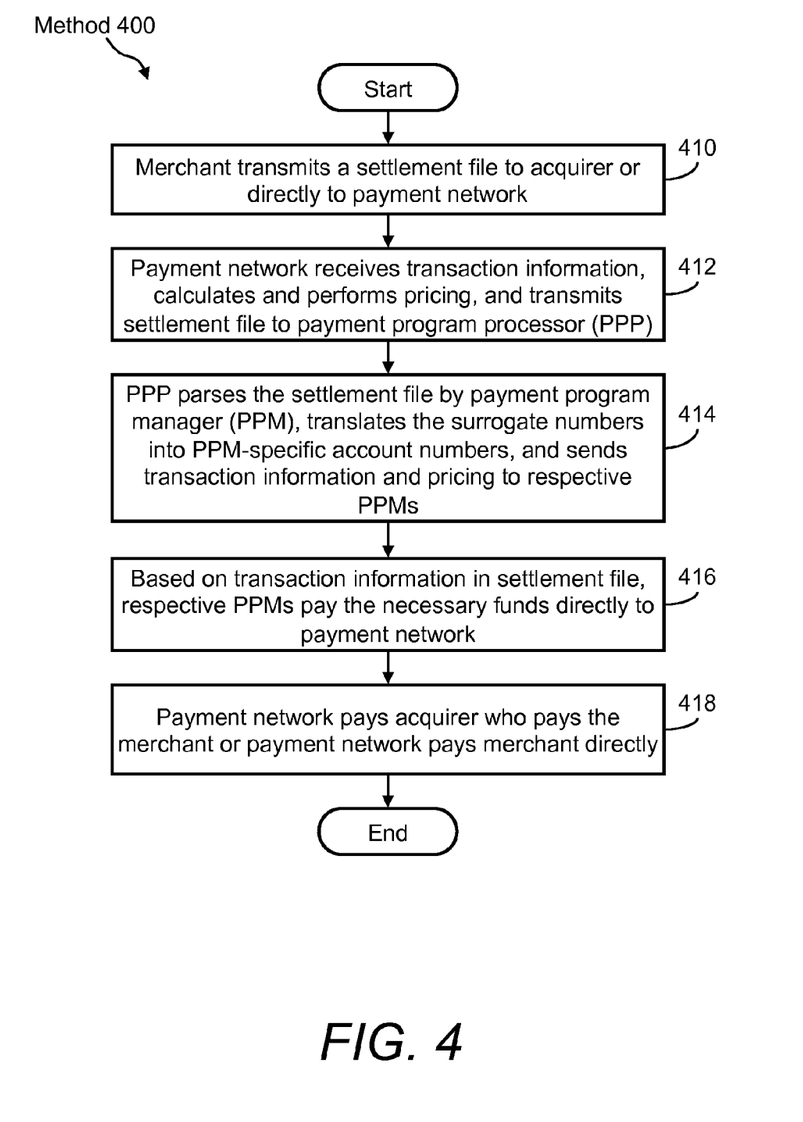
FIG. 4 illustrates a flow diagram of an example of a method of performing settlement of non-traditional payment transactions on a traditional payment network, according to the present invention.

FIG. 4 illustrates a flow diagram of an example of a method 400 of performing settlement of non-traditional payment transactions on a traditional payment network, according to the present invention. Method 400 is performed using payments system 100 of the present invention. Method 400 may occur following the execution of method 300 of FIG. 3. Method 400 may include, but is not limited to, the following steps, which may be implemented in any order.

At step 410, the merchant 118 transmits a settlement file to acquirer 120 or directly to payment network operator 110. A settlement file is any file that indicates, for example, the original PPM account number 129, the surrogate number 136, transaction date, transaction amount, whether the transaction is a sale, a return, or any type of adjustment, and the like.

At step 412, payment network operator 110 receives the transaction information from the merchant 118. Payment network operator 110 calculates and performs pricing to identify the correct interchange and fees, etc. to be paid to and charged from the PPMs 114. The payment network operator 110 combines the settlement file with all transaction and pricing information and sends the settlement file to the PPP 132.

At step 414, the PPP 132 parses the settlement file by PPM 114, translates the surrogate numbers into PPM-specific account numbers, and sends the transaction and pricing information to respective PPMs 114. For example, the PPP 132 sends transaction information associated with a first PPM 114 to this first PPM 114, the PPP 132 sends transaction information associated with a second PPM 114 to this second PPM 114, the PPP 132 sends transaction information associated with a third PPM 114 to this third PPM 114, and so on.

At step 416, based on the information in the settlement file, the respective PPMs 114 pay the necessary funds directly to payment network operator 110.

At step 418, payment network operator 110 pays acquirer 120 who pays the merchant 118 or payment network operator 110 pays the merchant 118 directly. At this point, the non-traditional transaction is considered settled.

Figure 5:
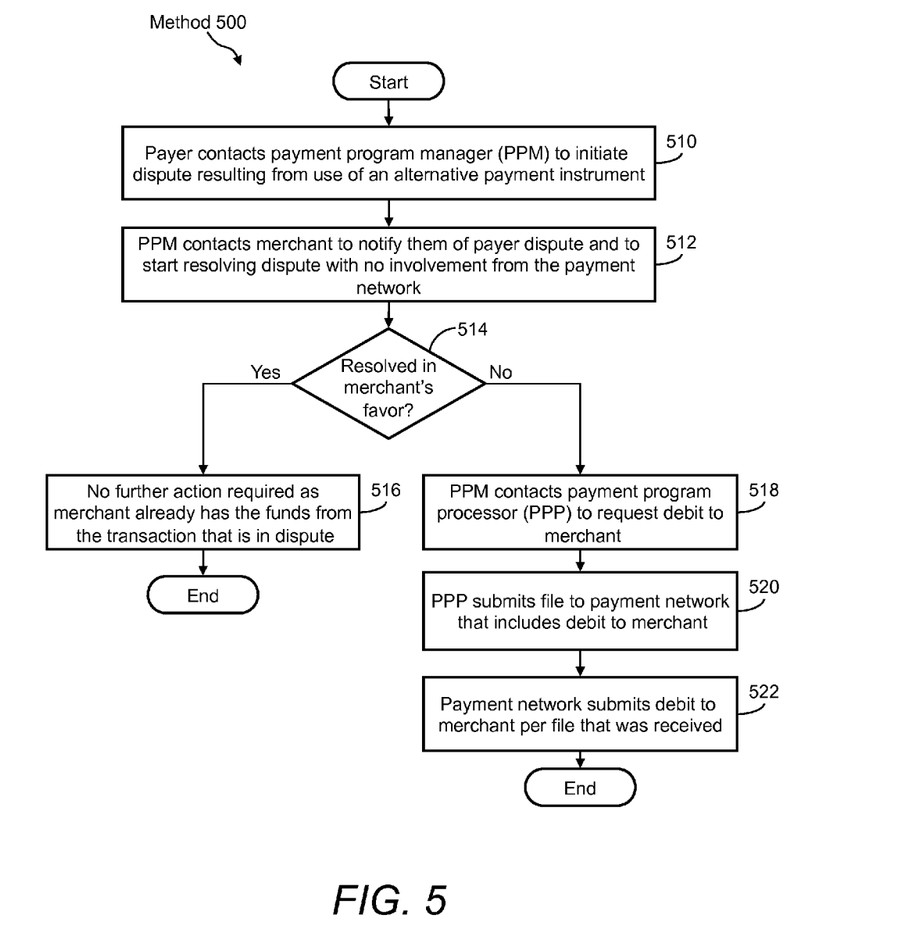
FIG. 5 illustrates a flow diagram of an example of a method of resolving disputes for alternative payment products on a traditional payment network, according to the present invention.

FIG. 5 illustrates a flow diagram of an example of a method 500 of resolving disputes for alternative payment products on a traditional payment network, according to the present invention. In particular, method 500 is an example of a method of processing credits and debits as a result of a dispute that was resolved outside of the traditional payment networks. Method 500 is performed using payments system 100 of the present invention. Method 500 may include, but is not limited to, the following steps, which may be implemented in any order.

At step 510, a certain payer 124 contacts a certain PPM 114 to initiate a dispute resulting from the use of its alternative payment instrument 128. An example of a dispute is a payer 124 who ordered a book from an Internet merchant 118 but never received the book at his/her home.

At step 512, the PPM 114 contacts the merchant 118 for which the transaction was processed to notify them of the payer dispute and to start resolving the dispute with no involvement from the payment network operator 110, and according to the disputes rules of the PPM 114.

At decision step 514, the PPM 114 determines whether the dispute is resolved in favor of the merchant 118. Continuing the example of the book dispute, PPM 114 resolves the dispute in favor of merchant 118 if the merchant 118 is able to prove that the payer 124 did receive the book. The merchant 118 can prove this, for example, by providing a receipt signed by the payer 124 that acknowledges that the payer has received the book. If PPM 114 resolves the dispute in favor of merchant 118, method 500 proceeds to step 516.

Again continuing the example of the book dispute, PPM 114 does not resolve the dispute in favor of merchant 118 if the merchant 118 is not able to provide proof of receipt of the book. For example, the merchant 118 may have provided a signed receipt acknowledging the receipt of the book but the receipt was actually not signed by the payer 124. If PPM 114 does not resolve the dispute in favor of merchant 118, method 500 proceeds to step 518.

At step 516, no further action is required as the merchant 118 already has the funds that were received from the payer 124 during the original transaction that was the subject of the dispute.

At step 518, the PPM 114 contacts the PPP 132 to request a debit to the merchant 118.

At step 520, the PPP 132 submits a file to payment network operator 110 that includes the debit to the merchant 118. Again, the file is any file that indicates, for example, the original PPM account number 129, the surrogate number 136, transaction date, transaction amount, whether the transaction is a sale, a return, or any type of adjustment, and the like.

At step 522, payment network operator 110 submits the debit to the merchant 118 per the file that was received from the PPP 132.

Figure 6:
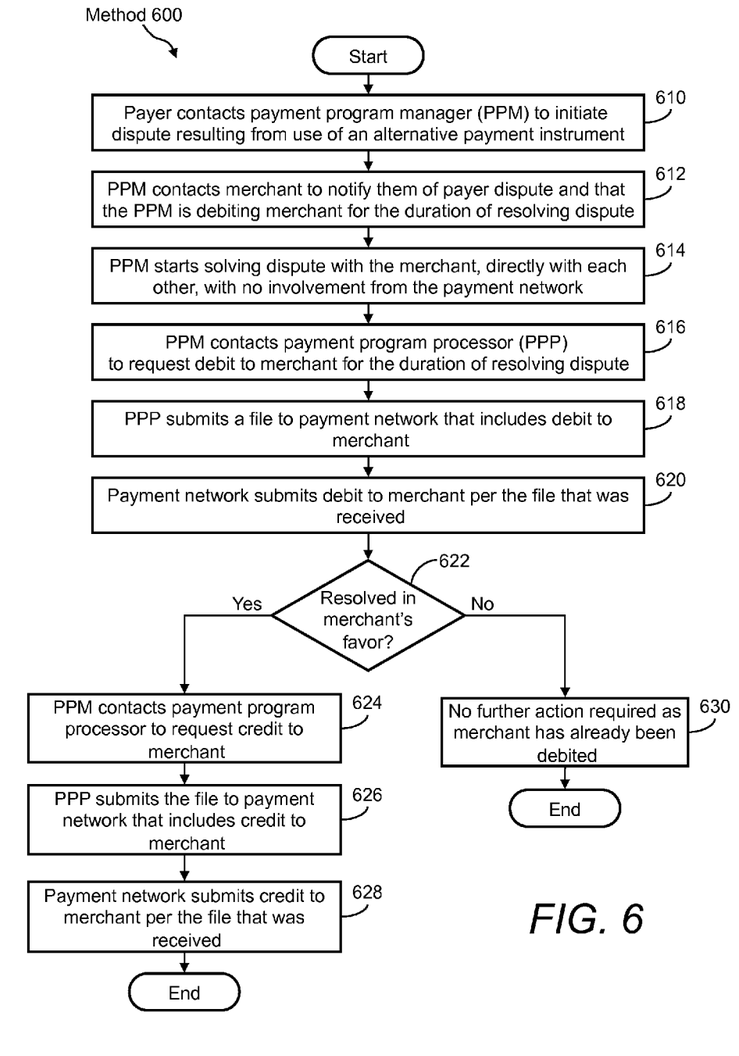
FIG. 6 illustrates a flow diagram of another example of a method of resolving disputes for alternative payment products on a traditional payment network, according to the present invention.

FIG. 6 illustrates a flow diagram of another example of a method 600 of resolving disputes for alternative payment products on a traditional payment network, according to the present invention. Method 600 is performed using payments system 100 of the present invention. Method 600 is substantially the same as method 500 except that the merchant is debited for the duration of resolving the dispute. Method 600 may include, but is not limited to, the following steps, which may be implemented in any order.

At step 610, a certain payer 124 contacts a certain PPM 114 to initiate a dispute resulting from the use of its alternative payment instrument 128. An example of a dispute is a payer 124 who ordered a book from an Internet merchant 118 but never received the book at his/her home.

At step 612, the PPM 114 contacts the merchant 118 for which the transaction was processed to notify them of the payer dispute and that the PPM 114 is debiting the merchant 118 for the duration of resolving dispute.

At step 614, the PPM 114 starts solving the dispute with the merchant 118, directly with each other, with no involvement from the payment network operator 110, and according to the disputes rules of the PPM 114.

At step 616, the PPM 114 contacts the PPP 132 to request a debit to the merchant 118 for the duration of resolving dispute.

At step 618, the PPP 132 submits a file to payment network operator 110 that includes the debit to the merchant 118. Again, the file is any file that indicates, for example, the original PPM account number 129, the surrogate number 136, transaction date, transaction amount, whether the transaction is a sale, a return, or any type of adjustment, and the like.

At step 620, payment network operator 110 submits the debit to the merchant 118 per the file that was received from the PPP 132.

At decision step 622, the PPM 114 determines whether the dispute is resolved in favor of the merchant 118. Continuing the example of the book dispute, PPM 114 resolves the dispute in favor of merchant 118 if the merchant 118 is able to prove that the payer 124 did receive the book. The merchant 118 can prove this, for example, by providing a receipt signed by the payer 124 that acknowledges that the payer has received the book. If PPM 114 resolves the dispute in favor of merchant 118, method 600 proceeds to step 624.

Again continuing the example of the book dispute, PPM 114 does not resolve the dispute in favor of merchant 118 if the merchant 118 is not able to provide proof of receipt of the book. For example, the merchant 118 may have provided a signed receipt acknowledging the receipt of the book but the receipt was actually not signed by the payer 124. If PPM 114 does not resolve the dispute in favor of merchant 118, method 600 proceeds to step 630.

At step 624, the PPM 114 contacts the PPP 132 to request a credit to the merchant 118.

At step 626, the PPP 132 submits a file to payment network operator 110 that includes the credit to the merchant 118.

At step 628, payment network operator 110 submits the credit to the merchant 118 per the file that was received from the PPP 132.

At step 630, no further action is required as the merchant 118 has already been debited at step 618.

In summary and referring to FIGS. 1 through 6, payments system 100 of the present invention includes one or more PPMs 114, which are the providers of alternative payment products, in combination with one or more PPPs 132, which serve as processors for the PPMs 114. The PPMs 114 and PPPs 132 are operating on payment network, which is a traditional payment network. The PPMs 114 establish a relationship with payment network operator 110 for processing their non-traditional transactions. Payment network operator 110 provides processing services for authorizations, settlement, disputes, reporting and PPM-specific pricing. The PPPs 132 serve as the aggregators between merchants 118 and the PPMs 114. The PPPs 132 generate surrogate numbers 136 in certain BIN ranges for processing transactions of alternative payment products, where these surrogate numbers 136 in certain BIN ranges are recognized by traditional processes of all parties and, thus, may be used in place of the original alternative payment products account numbers in order to facilitate benefits to all parties.

Certain benefits may be realized by use of payments system 100 of the present invention. For customers, such as payers 124, one benefit of using payments system 100 is that they now have more payment products choices and also more places at which to use the payment products. For merchants, such as merchants 118, benefits of using payments system 100 include, but are not limited to, acceptance of alternative payment products can be implemented fast, easily, and with very little technical resources; there is consolidated settlement; there is enhanced and differentiated reporting; there is a way to communicate deferred billing options, and there is payment product specific pricing. For processors, such as PPPs 132, benefits of using payments system 100 are that the processors may offer consolidated services and faster time to market to all clients. A further result of using payments system 100 may be that incremental transaction volume occurs with respect to the processors. For payment networks, such as the payment network operated by payment network operator 110, one benefit of using payments system 100 is that a new revenue stream is provided. A further result of using payments system 100 may be that incremental transaction volume occurs with respect to the payment network. For payment program managers, such as PPMs 114, benefits of using payments system 100 include, but are not limited to, additional acceptance of their alternative payment products, payments system 100 facilitates faster speed to market for merchant implementation, there is consolidated settlement, there is a way to communicate deferred billing options, and there is differentiated and enhanced reporting. And above all, the payment program managers may utilize their own pricing to merchants and maintain their own brand.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of processing a financial transaction between a payer and a merchant through an electronic financial transaction processing system using a first non-traditional payment mechanism, the method comprising:
   electronically receiving by a second operator of a traditional payment network, from an electronic device associated with the merchant, a request to authenticate the transaction, the request to authenticate the transaction comprising indicia for the payer and the first non-traditional payment mechanism;
   authenticating the payer with a first operator of the first non-traditional payment mechanism;
   determining, by an electronic device associated with the second operator of the traditional payment network, a surrogate number for association with the transaction, the surrogate number being a payment number for use on the traditional payment network and having been allocated by the second operator of the traditional payment network;
   associating, by said electronic device associated with the second operator of the traditional payment network, the surrogate number with the transaction in a mapping database;
   electronically transmitting, by said electronic device associated with the second operator of the traditional payment network, the surrogate number to the merchant;
   receiving from the merchant, by said electronic device associated with the second operator of the traditional payment network, a request to authorize the transaction via the traditional payment network, the request to authorize the transaction comprising indicia for the associated surrogate number and a dollar amount for authorization;
   transmitting, by the second operator of the traditional payment network, the request to authorize the transaction to the first operator of the first non-traditional payment mechanism; and transmitting, by said electronic device associated with the second operator of the traditional payment network, in response to the request to authorize the transaction, an authorization approval or decline indication to the merchant.

2. The method of claim 1, wherein the determining the surrogate number further comprises:
   querying a surrogate number database for an available surrogate number; and receiving the available surrogate number, the available surrogate number being within a subrange of surrogate numbers corresponding to the first non-traditional payment mechanism.

3. The method of claim 1, further comprising:
   receiving a settlement file from the second operator of the traditional payment network comprising a plurality of transactions at the merchant for a plurality of non-traditional payment mechanisms including the first non-traditional payment mechanism, each of the plurality of transactions associated with a surrogate number;
   identifying each transaction among the plurality of transactions that are associated with the first non-traditional payment mechanism;
   determining, for the identified associated transactions, associated indicia for the payer and the first non-traditional payment mechanism, and dollar amounts of the transactions;

sending the settlement file to the first operator of the first non-traditional payment mechanism for settlement of funds with the second operator of the traditional payment network in an amount corresponding to the dollar amounts of the identified associated transactions.

4. The method of claim 3, the determining the associated indicia for the payer further comprising:
performing a reverse-lookup of the surrogate number for the transaction in a surrogate number database.

5. A method of processing a financial transaction between a payer and a merchant through an electronic financial transaction processing system using a first non-traditional payment mechanism, comprising:
authenticating the payer with a first operator of the first non-traditional payment mechanism;
electronically receiving by a second operator of a traditional payment network, from an electronic device associated with the merchant, an authorization request for the transaction via the traditional payment network, the authorization request including a surrogate number previously associated with the transaction and indicia for use with the first non-traditional payment mechanism, the surrogate number being a payment number for use on the traditional payment network and having been allocated by a second operator of the traditional payment network;
transmitting, by an electronic device associated with the second operator of the traditional payment network, the authorization request to a processor of the first non-traditional payment mechanism via the traditional payment network, the processor of the first non-traditional payment mechanism being identifiable by at least a portion of the surrogate number;
determining, by said electronic device associated with the second operator of the traditional payment network, based on the surrogate number, a price to charge for processing the transaction; and
electronically transmitting, by said electronic device associated with the second operator of the traditional payment network, a response to the authorization request to the merchant.

6. The method of claim 5, wherein the price comprises one or both of a percentage of a transaction amount and a flat fee, to be charged to the merchant and payable to the first operator of the first non-traditional payment mechanism.

7. The method of claim 5, wherein the price further comprises additional fees payable to or by the second operator of the traditional payment network.

8. The method of claim 5, further comprising:
electronically receiving, from the merchant, a request to authenticate the transaction, the request to authenticate the transaction comprising indicia for the payer and the first non-traditional payment mechanism;
forwarding the request to authenticate the transaction to the processor of the first non-traditional payment mechanism;
receiving, from the processor of the first non-traditional payment mechanism, a response to the request to authenticate the transaction the response comprising the surrogate number; and
transmitting the surrogate number to the merchant.

9. The method of claim 5, further comprising:
receiving a settlement file comprising a plurality of transactions at the merchant, each of the plurality of transactions associated with a traditional payment number, a portion of the plurality of transactions associated with one or more non-traditional payment mechanisms and a portion of the plurality of transactions associated with a traditional payment mechanism;
identifying a subset of transactions from the plurality of transactions that are associated with at least said first operator of the non-traditional payment mechanism; and
transmitting, to the processor of the first non-traditional payment mechanism, the settlement file comprising information for the identified subset of transactions.

10. The method of claim 9, wherein the settlement file comprises indicia of fees to be paid to or collected from said first operator of the first non-traditional payment mechanism.

11. The method of claim 5, wherein determining the price to charge for the transaction comprises calculating the price from a plurality of pricing options based on a portion of the surrogate number.

12. A method of processing a financial transaction for a payer through an electronic financial transaction processing system using a non-traditional payment mechanism, comprising:
electronically receiving, by a second operator of a traditional payment network, from the payer and via an electronic device, purchase information for a transaction comprising indicia for the payer and the non-traditional payment mechanism;
transmitting an authentication request comprising the indicia for the payer to a processor of the non-traditional payment mechanism, wherein the payer is authenticated with the processor of the non-traditional payment mechanism;
receiving, by an electronic device associated with the second operator of the traditional payment network, in response to the transmission, a surrogate number for the transaction, the surrogate number having been associated with the transaction and the indicia for the payer and the surrogate number being a payment number for use on the traditional payment network and having been allocated by the second operator of the traditional payment network;
transmitting, by said electronic device associated with the second operator of the traditional payment network, an authorization request, via the traditional payment network, to the processor of the non-traditional payment mechanism, the authorization request comprising the surrogate number and a dollar amount for the financial transaction;
electronically submitting, by said electronic device associated with the second operator of the traditional payment network, to the first operator of the non-traditional payment mechanism, either directly or indirectly, a settlement file comprising the surrogate number; and
receiving an electronic transfer of funds, from the second operator for the traditional payment network, for the transaction.

13. The method of claim 12, wherein compensation received for the transaction differs from the dollar amount for the purchase by a discount rate, the discount rate having been determined based on the surrogate number.

14. The method of claim 13, wherein the discount rate comprises one or more of a percentage rate of the purchase and a per transaction fee.

15. The method of claim 12, further comprising: receiving a consolidated report from the second operator of the traditional payment network, the report comprising at least one summary of transactions made through the traditional payment mechanism, and at least one summary of transactions made through the non-traditional payment mechanism.

16. A system for processing a financial transaction between a payer and a merchant using a traditional payment network and a non-traditional payment mechanism, comprising:
   an input device, controlled by the merchant, configured to input indicia for the payer, the transaction and the non-traditional payment mechanism, wherein the indicia for the payer is authenticated with a first operator of the non-traditional payment mechanism;
   a non-traditional payment routing processor, in connection over an electronic financial transaction network with the input device, configured to determine that the transaction is to be performed in part through the non-traditional payment mechanism; and
   a non-traditional payment numbering system configured to associate a traditional payment number with the transaction, wherein the traditional payment number is allocated by a second operator of the traditional payment network, the non-traditional payment numbering system comprising:
   a first database configured to store traditional payment numbers available for association with the transaction;
   a number association engine configured to determine one of the available traditional payment numbers from the first database to associate with the transaction based upon stored determination criteria; and
   a mapping database configured to store information related to the association between the transaction and the traditional payment number;
   a pricing database configured to store pricing information corresponding to the traditional payment number; and
   a pricing engine configured to determine a price to charge for the transaction based upon stored information in the pricing database,
   wherein an electronic device associated with the second operator of the traditional payment network is configured to receive from the merchant a request to authorize the transaction, to transmit the request to authorize the transaction to the first operator of the first non-traditional payment mechanism and to transmit, in response to the request to authorize an authorization approval or decline indication to the merchant.

17. The system of claim 16, further comprising a non-traditional payment processing system, in connection with the mapping database, configured to determine from transaction information an associated non-traditional payment account, and configured to transmit the transaction information to a manager of the determined non-traditional payment account.

* * * * *